Nov. 28, 1967     J. A. BENNETT     3,355,035
PORTABLE TANK LOADER
Filed Jan. 28, 1965

INVENTOR
JEFFREY A. BENNETT
BY Joseph J. Connerton
ATTORNEY

United States Patent Office 3,355,035
Patented Nov. 28, 1967

3,355,035
PORTABLE TANK LOADER
Jeffrey A. Bennett, Box 3, Stone Ridge, N.Y. 12484
Filed Jan. 28, 1965, Ser. No. 428,783
2 Claims. (Cl. 214—1)

The present invention relates to handling apparatus and more particularly to a portable device adapted to handle cylindrical objects.

In certain handling operations which involve lifting, loading, unloading, moving, or similar manipulations, cylindrical objects such as tanks, gas cylinders, etc., presents a difficult handling problem. Such objects are quite heavy, unwieldy, cumbersome and more or less difficult to handle, such that handling operations involve a risk of personal injury, especially when performed by an individual, such injuries resulting from strain, slippage of the object being handled or the individual, etc. While apparatus designed to assist in handling heavy objects are known in the art, such apparatus is generally complex, expensive, bulky and more or less permanently mounted and difficult to operate such that they have no application corresponding to that contemplated by the present invention. Thus there exists a need for a manual handling device which is simple to operate, can be readily managed by an individual without special training, which is inexpensive to manufacture and is readily portable.

In accordance with the present invention, there is provided a manual handling device designed primarily to assist in handling objects such as cylinders, tanks, and similar devices which are hereinafter designated cylinders. The handling device comprises a rigid structure having a tubular central support column and a cradle corresponding generally to the contour of the article to be handled. The cradle is mounted on an inner tubular member and is rotatable in a plane parallel to the horizontal axis. The inner tubular member supporting the cradle is connected to the central support column through intermediate adjustable support columns which provides vertical adjustment of the handling device. Stability is provided by tubular leg members attached to the central support column but inclined at an angle thereto, such leg members being reinforced by interconnecting links or braces at their lower extremities. The interconnecting links in turn are connected through suitable fittings to a leg bracket on the lower extremity of the central support column, which bracket is collapsibly mounted to slide along the outer periphery of the central support column. A base member attached to the central support column provides additional stability and functions as the lower restrainer for the leg brace bracket. A second embodiment of the invention contemplates a cradle tilting configuration for inclining the cradle to any desired angle. When not in use, the legs of the handling device telescope about the center column to provide a relatively self-contained compact assemblage which folds into a very convenient package for easy transit. The device is light weight and readily portable, yet provides a rigid structure which can accommodate a heavy weight, thereby permitting the handling of heavy objects without undue risk of injury.

Accordingly, a primary object of the present invention is to provide an improved handling device.

Another object of the present invention is to provide an improved manual cylinder handling device.

Another object of the present invention is to provide an improved tank loading apparatus.

A further object of the present invention is to provide a portable loading apparatus adapted to assist an individual worker in loading cylindrical objects.

The foregoing and other objects, features, and advantages of the invention will be more apparent from the following more particular description of a preferred embodiment of the invention, as illustrated in the accompanying drawings.

Figure 1:
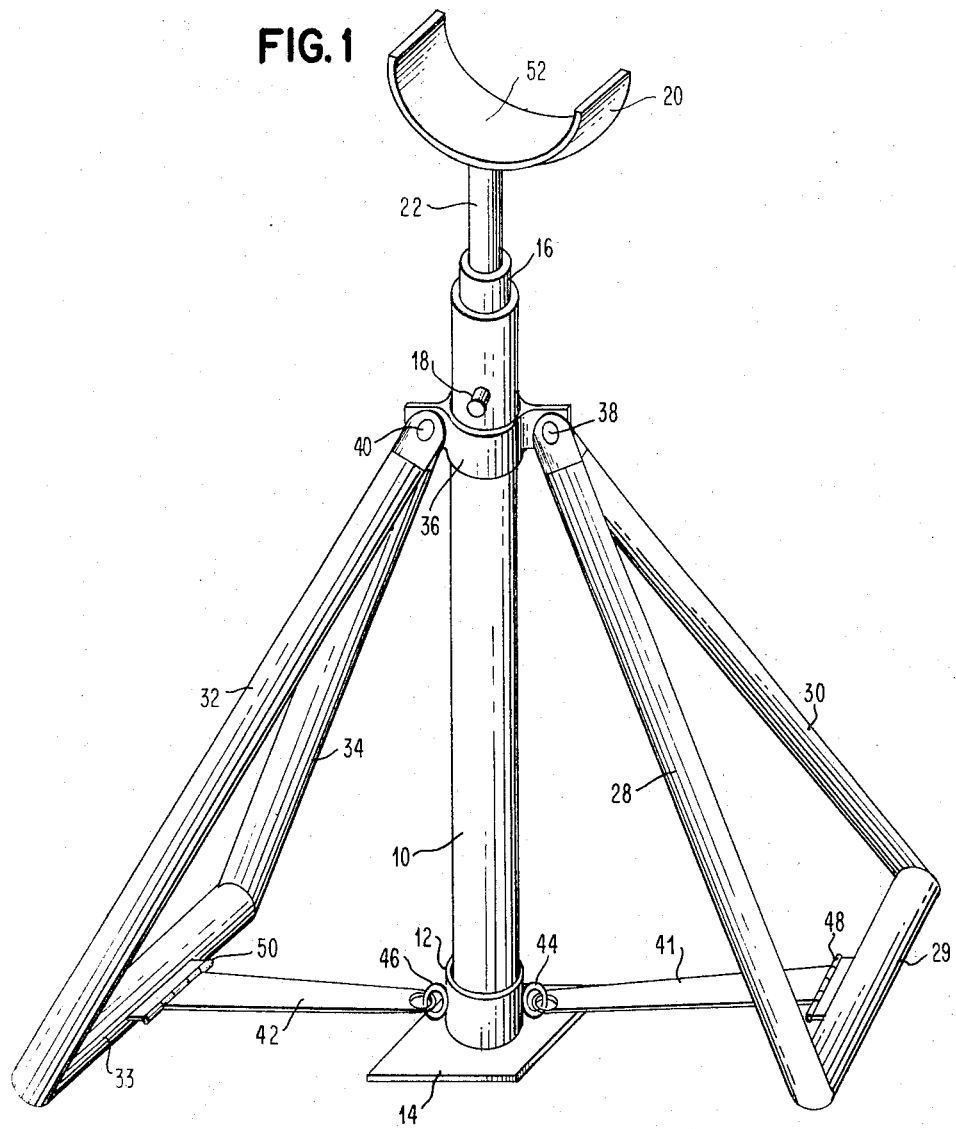
FIGURE 1 is a front elevation view of a cylinder handling device according to a preferred embodiment of the present invention.

Referring now to the drawings and more particularly to FIGURE 1 thereof, the instant invention is illustrated with legs extended in operating condition. The cylinder handling device comprises a central support column 10 which obviously supports essentially the full weight of the tank, etc., being handled and which is connected to a base member 14. Base member 14 comprises in the preferred embodiment a rectangular base plate which is welded or otherwise suitably attached to the bottom portion of support column 10. The dimensions of the base plate are designed to provide a stable support for objects being handled. An adjustable support column 16 fits within the central support column 10 and permits adjusting the device to the desired height within operational limits, after which it is locked in position by a pin 18 or other conventional means used in the associated opening. While not visible in the drawings, adjustment could be provided by a series of suitably spaced adjusting holes in adjustable support column 16. A cradle 20, capable of rotation, is securely attached to a third tubular member 22 which fits within adjustable support column 16 and is rotatable about is vertical axis.

Leg members 28, 30, and 32, 34, shown in their extended or open position, are pivotally connected to opposite sides of bracket 36 by pins or rivets 38, 40 respectively. Bracket 36, in turn, may comprise in its simplest embodiment a conventional pipe fitting which is rigidly attached to central support column 10 through conventional means such as welding, bolting, etc. Legs 28, 30 and 32, 34 are interconnected by tubular links or braces 29 and 33 respectively, which have a sufficient span to provide rigid support and prevent tilting of the device in operation. While the legs are shown composed of three interconnected tubular members which are cut at an angle and welded together, it will be appreciated that the invention also contemplates leg members composed of individual rods bent to conform to the desired leg configuration. The span of leg members 29 and 33 must be sufficient to stabilize the handling device even on uneven ground. In spreading or closing the legs, they pivot about their respective pins 38, 40 on bracket 36. Leg members 29 and 33 are affixed through connecting members 41 and 42 to rings 44 and 46 attached on opposite ends of bracket 12. In the preferred embodiment herein described, connecting members 41 annd 42 are shown as corresponding to conventional hinges which pivot about points 48, 50, although it will be appreciated that various means of pivotally connecting the lower leg members to the bracket 12 are contemplated by the present invention. In the preferred embodiment, the hinge members are shown as having a complementary circular opening at their end portions which mate with ring members 44 and 46 respectively. In assembly, rings 44 and 46 are welded closed and attached to bracket 12 after the rings of associated hinge members 41, 42 have been inserted therein. However, it will be appreciated that various suitable coupling means such as clips or snaps are contemplated within the scope of the invention. Bracket 12 is designed to provide a close fit about the outer wall of the central support column 10 thus preventing any shaking or wobbling during operation.

As previously described, the configuration of the cradle 20 is adapted to conform to the shape of the article being handled. Cradle 20 shown in FIGURE 1 is adapted to handle cylindrical objects and is contoured accordingly. The upper surface 52 of the cradle 20 is preferably made of nonmetallic material such as hard rubber which will maintain the article being handled in place during operation and prevent metal to metal contact during certain phases of the handling operation.

To illustrate the operation of the invention, a typical handling operation involving loading a cylinder will be described. After adjusting the device to the appropriate height through the adjustable support column in the manner heretofore described, the cylinder will be initially placed against the nearest edge of cradle 20. The width of the cradle 20 is designed to provide reasonable balance when a cylinder is supported thereon. The cylinder will be positioned on the cradle by manually raising the lower end or exerting downward pressure against the upper portion of the cylinder. Assuming the cylinder is supported about the midposition of the cradle, a force equal to approximately half the weight of the cylinder will be sufficient to raise the cylinder to a horizontal position on cradle 20. The cradle 20 and its cylindrical cargo can then be turned by rotating the cylinder until the unloading area, which might comprise a loading platform of a moveable conveyance, is reached. When in the proper position for unloading from the cradle, the cylinder can be readily loaded onto the platform by dropping the cradle in the desired direction to deposit the cylinder. When all cylinders have been loaded, the device is telescoped so that the legs return to their attenuated form, and the device in its portable form may now be taken and later utilized for the unloading operation. The advantages of such a handling device to one delivering a number of cylindrical devices will be obvious.

Figure 2:
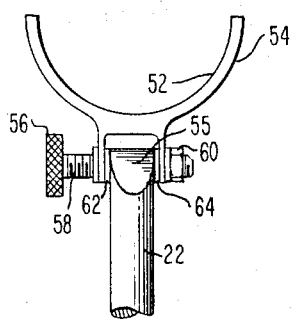
FIGURE 2 illustrates one embodiment of the invention having a tilting cradle configuration.

Referring now to FIGURE 2, there is illustrated a tilting cradle configuration. In certain types of handling operations, it is advantageous to have a tilting cradle, particularly when the cylinders being handled are unwieldy or heavy. In such circumstances, a tilting head configuration such as shown in FIGURE 2 may be employed. A cradle 54 is provided with a bottom portion which is secured on both sides to the upper extremity of rod 22 which in the illustrated embodiment has milled flat sides 55 and functions as the pivot member for the cradle. The rod 22 has pivot holes through which it is secured to both sides of the cradle by clamp screw 58 which is provided with a suitable manipulating knob 56 and a complementary nut 60. A pair of friction washers 62 and 64 are connected between rod 22 and the supporting members of cradle 54. When the knob is turned to the left or counterclockwise the cradle is loosened, when turned clockwise to the right, the device is tightened. The manipulating knob may be adjusted in the initial position such that the contour or pitch of the cradle 54 will be controlled by the cylinder being handled. While a specific tilting configuration is illustrated in FIGURE 2, it will be obvious that various other tilting arrangements could be suitably substituted.

Figure 3:
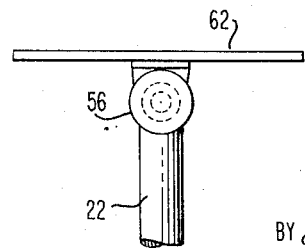
FIGURE 3 is a side view of a cradle configuration adapted to handle flat or rectangular objects.

Referring now to FIGURE 3, there is illustrated a side view of a tilting cradle having a cradle adapted to handle flat or rectangular objects. Certain handling applications may involve handling of flat or rectangular objects. In such cases, a flat surface will provide the requisite cradle configuration. FIGURE 3 illustrates a tilting cradle arrangement conforming to FIGURE 2 having a manipulating knob 56 adapted to tilt the cradle about its pivoting shaft 22. The upper surface of the cradle 62 is flat to handle rectangular objects, and provides certain advantages in handling to those afforded by the cylindrical cradle configuration shown in FIGURE 2.

From the above description it will be apparent that the present invention provides a manually operated handling device which permits handling of objects by an individual with increased safety. The device is preferably fabricated of light weight metal such as aluminum for maximum portability. The shape of the cradle is designed to accommodate the article being handled, and it will be apparent that a single handling device could incorporate a number of cradle configurations in accordance with the specific handling application.

While the invention has been particularly shown and described with reference to preferred embodiments thereof, it will be understood by those skilled in the art that various changes in form and details may be made therein without departing from the spirit and scope of the invention. It is the intention, therefore, to be limited only as specified in the following claims.

What is claimed is:

1. A portable apparatus adapted for tank handling applications comprising in combination a central support column, a base plate connected to the lower portion of said support column and adapted to rest on a supporting surface to bear the weight of the tank, a cradle having a configuration adapted to conform to that of the tank being handled, means associated with the central column and supporting said cradle for adjusting the vertical height of said cradle, pairs of hinged normally retracted leg members associated with said apparatus, said leg members being connected to a bracket associated to the upper region of said central support column and extending therefrom, said leg members including horizontal stabilizing members joining the lower portions thereof, and a slidable collar means for pivotally attaching said horizontal members to said central support column whereby said normally retracted legs may be extended during said tank handling application, said collar means being limited in downward displacement by said base plate, said cradle supporting means being rotatable in a horizontal plane to permit manual rotation of said cradle and its associated tank to the desired loading position without rotating said base plate or said leg members.

2. A device of the character claimed in claim 1 further comprising tilting means associated with said cradle member.

References Cited
UNITED STATES PATENTS

| | | | |
|---|---|---|---|
| 755,043 | 3/1904 | Pike | 248—171 |
| 1,984,695 | 1/1933 | Ley | 248—171 |
| 2,168,710 | 8/1939 | Johnson | 248—171 |
| 3,087,630 | 4/1963 | Karnow | 214—1 |
| 3,115,849 | 12/1963 | Johnson | 108—144 X |

HUGO O. SCHULZ, *Primary Examiner.*

MARVIN A. CHAMPION, *Examiner.*